(12) United States Patent  (10) Patent No.: US 6,715,615 B1
Williams  (45) Date of Patent: Apr. 6, 2004

(54) PRESSURE VESSEL

(76) Inventor: Richard T. Williams, P.O. Box 39, Uwchland, Chester County, PA (US) 19480

( * ) Notice: Subject to any disclaimer, the term of this patent is extended or adjusted under 35 U.S.C. 154(b) by 0 days.

(21) Appl. No.: 09/882,383

(22) Filed: Jun. 15, 2001

(51) Int. Cl.$^7$ .......................... B01D 27/08; B01D 35/31
(52) U.S. Cl. ...................... 210/435; 210/438; 210/448; 210/451; 210/453; 210/454; 210/460; 210/497.01; 55/507
(58) Field of Search ................................ 210/437–438, 210/445–446, 448, 457, 460, 435, 453–454, 451, 459–462; 55/505, 507, 511

(56) References Cited

U.S. PATENT DOCUMENTS

| 3,002,870 A | * | 10/1961 | Belgarde et al. | ............ 156/292 |
| 3,672,510 A | * | 6/1972 | Saito et al. | .................. 210/438 |
| 3,696,932 A | * | 10/1972 | Rosenberg | .................. 210/437 |
| 3,776,384 A | * | 12/1973 | Offer | .......................... 210/209 |
| 5,230,812 A | | 7/1993 | Williams | |
| 6,171,492 B1 | * | 1/2001 | Hedgepeth et al. | ......... 210/243 |

* cited by examiner

Primary Examiner—Joseph Drodge
Assistant Examiner—Marianne S. Ocampo
(74) Attorney, Agent, or Firm—John F. A. Earley; John F. A. Earley, III; Harding, Earley, Follmer & Frailey

(57) ABSTRACT

A pressure vessel comprises a top wall, a bottom wall, a side wall extending between the top wall and the bottom wall, and a chamber formed by said walls, an inlet port extending through one of the walls for introducing fluid to the pressure vessel, an outlet port extending through one of the walls for removing fluid from the pressure vessel, a pressure gradient member located within the chamber of the pressure vessel through which fluid passing through the pressure vessel flows as the fluid passes through the pressure vessel, the pressure gradient member including an outlet port, and a flexible resilient tube attached to and extending between the outlet port of the pressure gradient member and the outlet port of the pressure vessel for mounting the pressure gradient member within the chamber formed by the walls of the pressure vessel and for connecting the outlet port of the pressure gradient member to the outlet port of the pressure vessel and for providing substantially uniform support of a load on the pressure gradient member created by side impact to the pressure vessel.

14 Claims, 2 Drawing Sheets

PRESSURE VESSEL

BACKGROUND OF THE INVENTION

1. Field of the Invention

This invention relates to a permanently sealed and/or disposable pressure vessel for conditioning and/or for treating and/or for filtering and/or for purifying a fluid, and particularly concerns a permanently sealed pressure vessel having a shock resistant mounting for the pressure gradient member mounted within the pressure vessel.

2. Description of the Prior Art

In conventional pressure vessels used for conditioning and/or purifying a fluid, a pressure gradient member, such as a purification and/or filtration cartridge, is mounted in place within the pressure vessel by adhering the top end plate of the cartridge to the top wall of the pressure vessel (hereinafter referred to as "adhesive mounting"). When the cartridge is mounted in place within the pressure vessel, appropriate seals provide that only fluid that has passed through the cartridge exists the pressure vessel.

A problem with these conventional pressure vessels is that when they receive a severe side impact, such its that which might be incurred if the pressure vessel is dropped during installation, conveyance, or portable use, the impact may result in cantilevered breakage of the cartridge off of the top wall of the pressure vessel, which leads to failure of the seals between the outlet port of the pressure vessel and the cartridge. When this happens, the damaged assembly must be replaced with a new complete system. Furthermore, partial damage may result in use of a compromised assembly.

SUMMARY OF THE INVENTION

It is an object of the invention to provide a pressure vessel that is more shock resistant to side impacts than the conventional pressure vessels mentioned above.

This object and other objects are accomplished by my invention which is set out below.

DETAILED DESCRIPTION OF THE DRAWINGS

Figure 1:
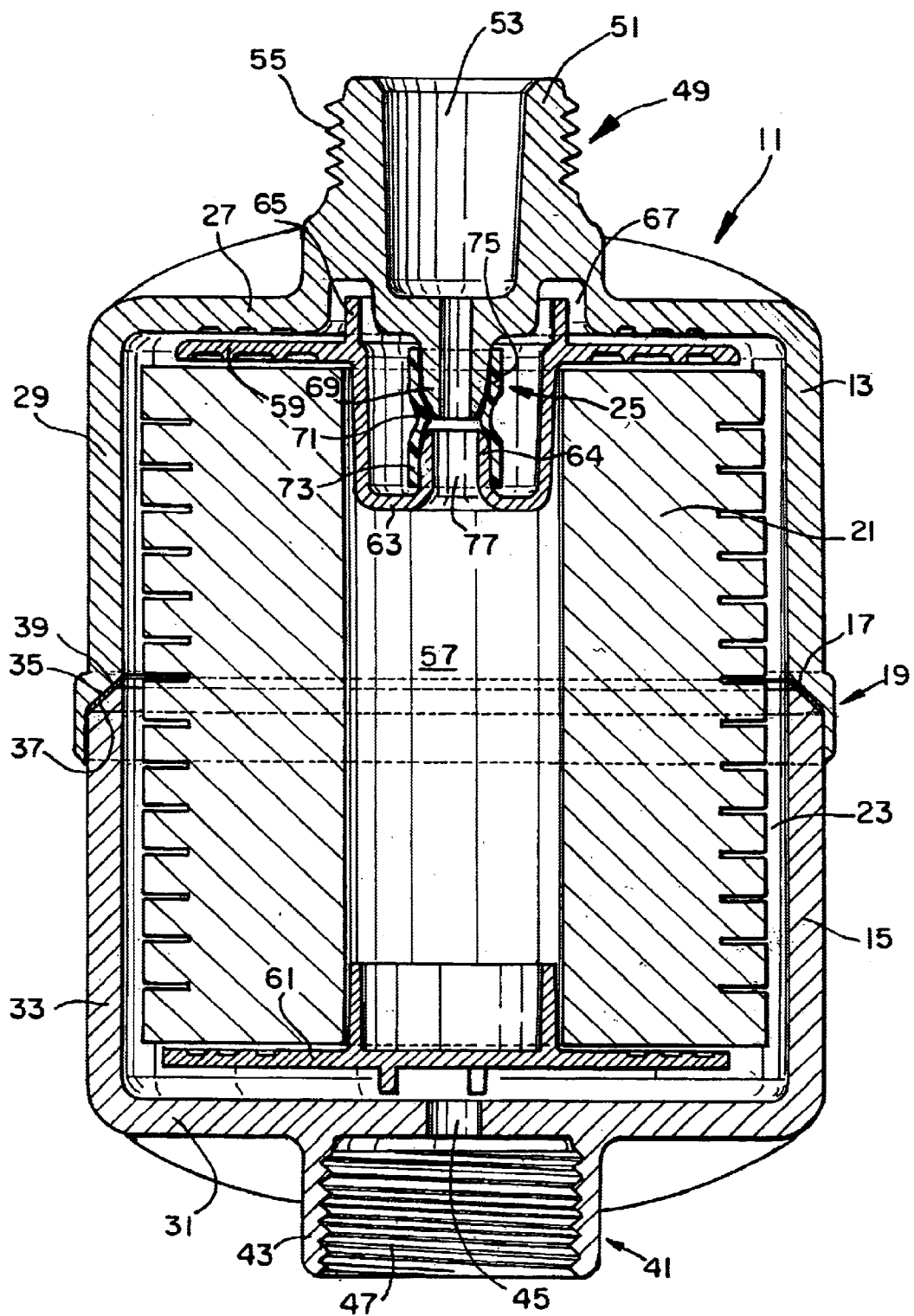
FIG. 1 is a view in cross section of a pressure vessel constructed in accordance with the invention.

Turning now to the drawings, there is shown in FIG. 1 a pressure vessel 11 for conditioning and/or for treating and/or for filtering and/or for purifying a fluid. Pressure vessel 11 comprises a cover 13, a bowl 15 positioned below the cover 13, sealing means 17 between the cover 13 and the bowl 15 for sealing between the cover 13 and the bowl 15, securing means 19 for securing the cover 13 to the bowl 15, a pressure gradient member 21 located within a chamber 23 formed by the union of the cover 13 and the bowl 15, and means 25 for mounting the pressure gradient member 21 within the chamber 23.

Cover 13 has a top wall 27 and a side wall 29 extending downwardly from the top wall 27. Bowl 15 has a bottom wall 31 and a side wall 33 extending upwardly from the bottom wall 31.

Scaling means 17 comprises a permanent bond which may or may not include a gasket 35 that is seated on the rim 37 of the side wall 33 of the bowl 15, which seals between the cover 13 and the bowl 15 when compressed between the rim 39 of the side wall 29 of the cover 13 and the rim 37 of the side wall 33 of the bowl 15.

Securing means 19 for securing the cover 13 to the bowl 15 comprises an adhesive, or a welded joint, or a V-clamp, or a threaded or interlocking joint, or a track and flexible shear rod securing device such as that disclosed in my U.S. Pat. No. 5,230,812 which is incorporated herein by reference, or any other conventional securing member.

Inlet means 41 for introducing fluid to the pressure vessel 11 is formed in the bottom wall 31 of the bowl 15, and inlet means 41 includes an inlet port 43 which extends through the bottom wall 31 of the bowl 15 and surrounds an inlet channel 45. The inlet port 43 shown in the drawings is provided with internal threading 47 which receives external threading of a fitting of a hose or pipe from which the fluid to be introduced into the pressure vessel 11 comes. However, any conventional connection means may be substituted.

Outlet means 49 for removing fluid from the pressure vessel 11 is formed in the top stall 27 of the cover 13, and outlet means 49 includes an outlet port 51 which extends through the top wall 27 of the cover 13 and surrounds an outlet channel 53. The outlet port 51 shown in the drawings is provided with external threading 55 which receives internal threading of a fitting of a hose or pipe into which the fluid leaving pressure vessel 11 goes, or the pressure vessel may discharge directly, without connection to a conveyance means.

The pressure gradient member 21 preferably comprises a cartridge having a portion 57 for filtering or conditioning or treating or purifying the fluid mounted between an upper end plate 59 and a lower end plate 61. The central portion 63 of the tipper end plate 59 has a cup-like shape that extends downwardly to fit into the top of portion 57. An upwardly extending outlet port 64 for the pressure gradient member 21 is formed in the bottom of the cup-like central portion 63 of the upper end plate 59 through which fluid may exit portion 57 of the pressure gradient member 21.

The upper end plate 59 also has an upwardly extending annular ridge 65 that surrounds its cup-like central portion 63. The annular ridge 65 is received by an annular groove 67 formed in the top wall 27 of the cover 13. The annular groove 67 is larger than the annular ridge 65 to permit a limited amount of lateral movement of the pressure gradient member 21 across the top wall 27 of the cover 13.

The outlet port 51 has a downwardly extending portion 69 that is aligned directly above the upwardly extending outlet port 64 of the pressure gradient member Mounting means 25 comprises a flexible tube 71, preferably made of resilient plastic or rubber, that extends between the outlet port 64 of the pressure gradient member 21 and the outlet port 51 of the outlet means 49, with a first end portion 73 of the tube 71 being snugly press-fit over the outlet port 64 of the pressure gradient member 21 and a second end portion 75 of the tube 71 being snugly press-fit over the portion 69 of the outlet port 51.

The resilient tube 71 connects the outlet channel 77 extending through the outlet port 64 of the pressure gradient member 21 to the outlet channel 53 extending through the outlet port 51 of the outlet means 49, such that only fluid that has passed through the pressure gradient member 21 exits the pressure vessel 11.

In use, fluid, such as untreated water, may be passed into the pressure vessel 11 along the inlet channel 45 through the inlet port 43 and then into and through the pressure gradient member 21 to the outlet port 64 of the pressure gradient member 21. From the outlet port 64, the fluid then may pass into and through the tube 71 to the outlet port 51 along the outlet channel 53 to a line connected to the outlet port 51.

Figure 2:
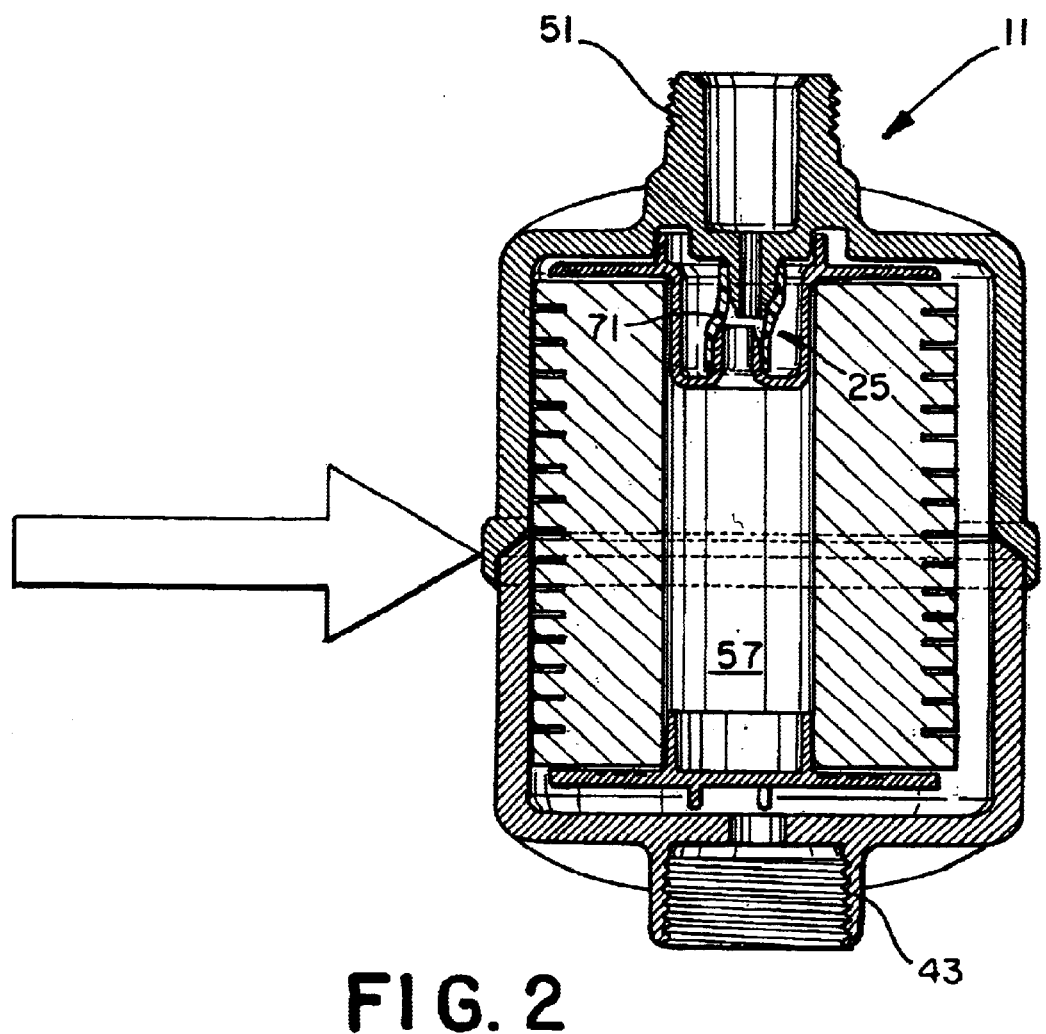
FIG. 2 is a view in cross section of the invention illustrating what happens when the pressure vessel receives a side impact.

The mounting means 25 provides substantially uniform support of a load on the pressure gradient member 21 created by side impact to the pressure vessel 11. Rather than resulting in cantilevered breakage when the pressure vessel receives a severe side impact found with the prior art adhesive mounting of the pressure gradient member to the top wall of the pressure vessel, which leads to failure of the seal between the outlet port of the pressure vessel and the pressure gradient member, the pressure gradient member 21 in accordance with the invention, as illustrated in FIG. 2, swings or laterally shifts inside the pressure vessel 11, when the pressure vessel 11 receives an impact, due to the mounting means 25 of the invention, resulting in the pressure gradient member 21 remaining mounted within the pressure vessel 21 and the seal between the outlet port 64 of the pressure gradient member 21 and the outlet port 51 of the pressure vessel 11 being maintained.

A preferred use for the pressure vessel of the invention is in portable water systems for R.V.'s (recreational vehicles), such as campers, boats, and other outdoor applications.

What is claimed is:

1. A pressure vessel comprising
   a top wall, a bottom wall, a side wall extending between the top wall and the bottom wall, and a chamber formed by said walls,
   inlet means extending through one of the walls for introducing fluid to the pressure vessel,
   outlet means extending through one of the walls for removing fluid from the pressure vessel, the outlet means including an outlet port,
   a pressure gradient member located within the chamber of the pressure vessel through which fluid passing through the pressure vessel flows as the fluid passes through the pressure vessel, the pressure gradient member including an outlet port,
   flexible resilient tube means extending between the outlet port of the pressure gradient member and the outlet port of the outlet means for mounting the pressure gradient member within the chamber formed by the walls of the pressure vessel and for connecting the outlet port of the pressure gradient member to the outlet port of the outlet means and for permitting the pressure gradient member to laterally shift inside the pressure vessel to press against the side wall of the pressure vessel, the flexible resilient tube mean having a first end portion and a second end portion, and
   the first end portion of the flexible resilient tube means being fastened to the outlet port of the outlet means sealing between the first end portion of the flexible resilient tube means and the outlet port of the outlet means.

2. The pressure vessel of claim 1, the flexible resilient tube means comprising
   a flexible resilient tube,
   the flexible resilient tube having a first end portion and a second end portion, the first end portion being mounted over the outlet port of the pressure gradient member and the second end portion being mounted over the outlet port of the outlet means.

3. The pressure vessel of claim 1, the pressure gradient member comprising
   a cartridge.

4. The pressure vessel of claim 1,
   the flexible resilient tube means comprising a flexible resilient tube, the flexible resilient tube having a first end portion and a second end portion, the first end portion being mounted over the outlet port of the pressure gradient member and the second end portion being mounted over the outlet port of the outlet means, and the pressure gradient member comprising a cartridge.

5. A pressure vessel comprising
   a top wall, a bottom wall, a side wall extending between the top wall and the bottom wall, and a chamber formed by said walls,
   inlet means extending through one of the walls for introducing fluid to the pressure vessel,
   outlet means extending through one of the walls for removing fluid from the pressure vessel, the outlet means including an outlet port,
   a pressure gradient member located within the chamber of the pressure vessel through which fluid passing through the pressure vessel flows as the fluid passes through the pressure vessel, the pressure gradient member including an outlet port, and
   flexible resilient tube means extending between the outlet port of the pressure gradient member and the outlet port of the outlet means for mounting the pressure gradient member within the chamber formed by the walls of the pressure vessel and for providing a seal between a first end portion of the flexible resilient tube means and the outlet port of the outlet means and a seal between a second end portion of the flexible resilient tube means and the outlet port of the pressure gradient member and for connecting the outlet port of the pressure gradient member to the outlet port of the outlet means and for permitting the pressure gradient member to laterally shift inside the pressure vessel to press against the side wall of the pressure vessel to provide substantially uniform support of a load on the pressure gradient member created by side impact to the pressure vessel without breaking the seal between the first end portion of the flexible resilient tube means and the outlet port of the outlet means and the seal between the second end portion of the flexible resilient tube means and the outlet port of the pressure gradient member.

6. The pressure vessel of claim 5, the flexible resilient tube means comprising
   a flexible resilient tube,
   the flexible resilient tube having a first end portion and a second end portion, the first end portion being mounted over the outlet port of the pressure gradient member and the second end portion being mounted over the outlet port of the outlet means.

7. The pressure vessel of claim 5, the pressure gradient member comprising
   a cartridge.

8. The pressure vessel of claim 5,
   the flexible resilient tube means comprising a flexible resilient tube, the flexible resilient tube having a first end portion and a second end portion, the first end portion being mounted over the outlet port of the pressure gradient member and the second end portion being mounted over the outlet port of the outlet means, and
   the pressure gradient member comprising a cartridge.

9. A pressure vessel comprising a top wall, a bottom wall, a side wall extending between the top wall and the bottom wall, and a chamber formed by said walls, inlet means extending through one of the walls for introducing fluid to the pressure vessel, outlet means extending through one of the walls for removing fluid from the pressure vessel, the outlet means including an outlet port, a pressure gradient member located within the chamber of the pressure vessel through which fluid passing through the pressure vessel flows as the fluid passes through the pressure vessel, the pressure gradient member including an outlet port, and a flexible resilient tube extending between the outlet port of the pressure gradient member and the outlet port of the outlet means for mounting the pressure gradient member within the chamber formed by the walls of the pressure vessel and for connecting the outlet port of the pressure gradient member to the outlet port of the outlet means, the flexible resilient tube having a first end portion and a second end portion, the first end portion being press fit over the outlet port of the outlet means and the second end portion being press fit over the outlet port of the pressure gradient member, and the flexible tube permitting the pressure gradient member to laterally shift inside the pressure vessel to press against the side wall of the pressure vessel.

10. The pressure vessel of claim 9, the pressure gradient member comprising a cartridge.

11. A pressure vessel comprising a top wall, a bottom wall, a side wall extending between the top wall and the bottom wall, and a chamber formed by said walls, inlet means extending through one of the walls for introducing fluid to the pressure vessel, outlet means extending through one of the walls for removing fluid from the pressure vessel, the outlet means including an outlet port, a pressure gradient member located within the chamber of the pressure vessel through which fluid passing through the pressure vessel flows as the fluid passes through the pressure vessel, the pressure gradient member including an outlet port, a flexible resilient tube extending between the outlet port of the pressure gradient member and the outlet port of the outlet means for mounting the pressure gradient member within the chamber formed by the walls of the pressure vessel and for connecting the outlet port of the pressure gradient member to the outlet port of the outlet means, and the flexible resilient tube providing substantially uniform support of a load on the pressure gradient member created by side impact to the pressure vessel by permitting the pressure gradient member to laterally shift inside the pressure vessel to press against the side wall of the pressure vessel.

12. The pressure vessel of claim 11, the pressure gradient member comprising a cartridge.

13. A pressure vessel comprising a top wall, a bottom wall, a side wall extending between the top wall and the bottom wall, and a chamber formed by said walls, inlet means extending through one of the walls for introducing fluid to the pressure vessel, outlet means extending through one of the walls for removing fluid from the pressure vessel, the outlet means including an outlet port, a pressure gradient member located within the chamber of the pressure vessel through which fluid passing through the pressure vessel flows as the fluid passes through the pressure vessel, the pressure gradient member including an outlet port, a flexible resilient tube extending between the outlet port of the pressure gradient member and the outlet port of the outlet means for mounting the pressure gradient member within the chamber formed by the walls of the pressure vessel and for connecting the outlet port of the pressure gradient member to the outlet port of the outlet means, the flexible resilient tube having a first end portion and a second end portion, the flexible tube permitting the pressure gradient member to laterally shift inside the pressure vessel to press against the side wall of the pressure vessel, the first end portion of the flexible resilient tube being fastened to the outlet port of the outlet means, and the second end portion of the flexible resilient tube being fastened to the outlet port of the pressure gradient member.

14. The pressure vessel of claim 13, the pressure gradient member comprising a cartridge.

* * * * *